United States Patent [19]

Lee, II

[11] Patent Number: 5,160,226
[45] Date of Patent: Nov. 3, 1992

[54] TAPERED EXPANSION SEALING PLUG

[75] Inventor: Leighton Lee, II, Guilford, Conn.

[73] Assignee: The Lee Company, Westbrook, Conn.

[21] Appl. No.: 483,235

[22] Filed: Feb. 22, 1990

[51] Int. Cl.⁵ .............................................. F16B 13/06
[52] U.S. Cl. ....................................... 411/72; 411/45; 411/69
[58] Field of Search ...................... 411/40, 41, 44, 45, 411/71, 72, 271; 138/89, 90

[56] References Cited

U.S. PATENT DOCUMENTS

| | | | |
|---|---|---|---|
| 577,737 | 2/1897 | Flaherty | 411/15 |
| 2,821,323 | 1/1958 | Lee, II | 411/72 |
| 3,200,694 | 8/1965 | Rapata | 411/41 |
| 3,525,365 | 8/1970 | Meulendyk et al. | 411/41 |
| 3,825,146 | 7/1974 | Hirmann | 138/89 |
| 4,113,006 | 9/1978 | Clapp | 138/89 |
| 4,186,645 | 2/1980 | Zaydel | 411/271 |

FOREIGN PATENT DOCUMENTS

| | | | |
|---|---|---|---|
| 2105546 | 8/1971 | Fed. Rep. of Germany | 411/44 |
| 1236249 | 6/1971 | United Kingdom | 411/41 |

*Primary Examiner*—Neill R. Wilson
*Attorney, Agent, or Firm*—Philip J. Lee

[57] ABSTRACT

An expansion sealing plug having a frusto-conical plug body with peripheral U-shaped grooves, an expansion member comprising either an inner wedge pin or a spherical member, and a tapered coaxial bore for receiving the expansion member. The inner wedge pin has a greater average outside diameter and the spherical member has a greater maximum outside diameter than the tapered coaxial bore. The plug body and expansion member are proportioned to be readily preassembled such that the expansion member is frictionally retained after partial insertion into the plug body. The unexpanded plug is inserted into a counterbore that is reamed or formed with the same taper angle as the plug body and the expansion member is driven axially into the plug such that the plug body is radially expanded to forcibly engage the counterbore.

16 Claims, 4 Drawing Sheets

TAPERED EXPANSION SEALING PLUG

BACKGROUND OF THE INVENTION

A. Field of Invention

The present invention relates generally to expansion sealing plugs and more particularly to a new and improved tapered expansion plug for sealing access and other bores in metal castings, metal forgings and other metal parts as well as plastic parts.

B. Description of Related Art

Prior art expansion plugs of the type disclosed in the U.S. Pat. No. 2,821,323 of Leighton Lee, II, granted Jan. 28, 1958 and entitled "Pin Plug" have been designed for sealing hydraulic systems. Increased hydraulic system pressures have required utilizing materials of substantially higher strength and hardness, which in turn required an improved expansion plug as disclosed in U.S. Pat. No. 4,867,333 to Kolp, Anderson and Dickey granted Sep. 1989 entitled "High Pressure Pin Plug" which improvements provide for sealing of hydraulic systems exposed to higher ranges of system pressures. Both said prior art plugs function by the controlled expansion of a cylindrical plug member by the forcible insertion of a tapered pin into a central, axially extending bore in the plug member, thereby expanding the plug walls to engage the installation bore. Similarly, the expansion plug disclosed in U.S. Pat. No. 3,825,146 to Hirmann, granted Jul. 23, 1974 involves the use of an inner expansion member, in this case a ball, that is forced into a bore of lesser diameter. Said plugs require a shoulder within the installation bore to prevent the plug from moving during insertion of the expansion member. For these reasons, installation of the prior art plugs require the reaming of an installation bore of greater inside diameter than the original opening. Due to the relatively small size of the plugs, minor variations in tooling or reaming technique can produce clearances between the outside surface of the plug and the inside surface of installation bore that are significant to the function of the plug. Therefore, in said prior art expansion plugs, an installation tolerance must be allowed between the installation bore and the unexpanded plug outer surface. During installation of a prior art expansion plug, a portion of the radial expansion of the plug may take place before engagement with the installation bore as the clearance is being bridged. The prior art plug members are of uniform outside diameter which must not exceed the inside diameter of the installation bore. At the same time, there is a maximum clearance between the plug walls and the installation bore that can be bridged by the plug expansion without unacceptably compromising the function of the plug. The specified performance level, i.e. the blowout pressure of the plug, depends upon the radial force exerted against the installation bore which in turn depends upon the amount of expansion of the plug after the clearance between the plug outer surface and the installation bore has been bridged. Therefore, the total plug expansion must be increased by adding the installation tolerance to the expansion required for specified sealing performance. As an example, if, given particular materials, bore size and other variables, a minimum radial expansion of eight-thousandths of an inch is required while a two-thousandths of an inch radial tolerance must be allowed for variations in the diameter of the installation bore, the total expansion of the plug must equal the sum of the minimum expansion and the installation tolerance, in this case, ten thousandths of an inch. It is to be expected that some installations will result in a perfect fit and as a result, the component must tolerate the total radial expansion (0.010 inches in the example). The anticipation of occasional total radial expansions greater than that required for sealing must therefore be considered in the design of the component that includes the installation bore. Frequently the installation bore is formed in a boss designed to absorb the stress of the expansion. Generally, greater expansion requires a boss of larger diameter that would therefore be heavier. A component that must be heavier than is otherwise required is generally considered to be a disadvantage, particularly in aerospace applications. The additional expansion needed in the prior art plugs to absorb the installation tolerance has a number of adverse consequences in addition to the consideration of the installation environment. In particular, in the plugs utilizing pins as the expansion members, it has been found necessary to put a wax coating on the pin to aid installation. In addition, preassembly of the pin and plug members has not been found to be practical, in part because of the large diameter of the pin and in part because of the radial distortion of the plug body caused by preinsertion. Because the pin is not inserted into the plug under controlled conditions, a vent bore must be provided through the pin to allow the escape of any matter that would otherwise prevent or hinder installation. The wax coating and vent bore increase the manufacturing costs of the prior art plugs and the assembly required makes installation more difficult than would be the case for an one piece plug.

In addition, in practice, in circumstances where there is insufficient or negative clearance between the installation bore and the outside diameter of the plug of the prior art, the plug may be forced into the installation bore damaging the sealing surfaces. Further, the prior art expansion plugs, because of the importance of minimizing the bore-plug clearance, must be manufactured and stocked in numerous sizes to match the size of the bores. Even with the availability of a variety of sizes, installation must be relatively precise to assure proper functioning of the plug.

SUMMARY OF THE INVENTION

The invention herein described is a new and improved expansion plug wherein the plug body has an axially tapered outside surface forming a frusto-conical bore engaging surface, with the outer end having a larger diameter than the inner end. The plug comprises a plug body and an expansion member that is inserted into socket formed by a coaxial bore axially extending from the outer end of the plug body, which is open, to an inner end wall at the inner end of the plug body. The diameter of the expansion member is greater than the inside diameter of the coaxial bore such that the plug is radially expanded during installation. The expansion member may be partially preassembled with the plug body by partial insertion within the socket. An installation bore into which the plug of the instant invention is to be inserted is first reamed or formed to provide the same taper angle as the bore engaging surface of the plug body. As the plug is inserted into the installation bore, the parallel opposing surfaces of the plug body and installation bore are moved into snug engagement. After insertion of the plug into the installation bore the expansion member is driven further into the coaxial plug bore causing the plug body to be controllably radially expanded due to difference between the outside diameter of the expansion member and the inside diameter of the coaxial plug bore. In one of the illustrated preferred embodiments, the expansion member is a tapered pin that is to be inserted into a coaxial bore in the plug body that is also tapered. Alternative configurations of the expansion member include spherical or ball shaped members as well as pins with no or negligible taper and with such expansion members, the taper of the coaxial bore may be slight or nonexistent.

Due to the taper of the installation bore, a shoulder within the installation bore is not required to limit the inward axial movement of the plug body in response to the force exerted upon the expansion member during installation. The inside diameter of the installation bore is not required to be as precisely regulated as in the prior art plugs, since variations between the plug outside diameter and the inside diameter of the installation bore result in variations in the depth to which the plug is inserted rather than resulting in a clearance or interference between the bore engaging surface of the plug and the inner surface of the installation bore. In the plug of the present invention little if any of the radial expansion is used to bridge the clearance between the plug and the installation bore and accordingly most or all of the radial expansive force is directed to engagement of the plug and the installation bore. Since only a light force is required or desired for inserting the plug into the reamed installation bore, the occasions for damage to the surfaces of the plug and installation bore are reduced.

In the present invention the reduction of the radial clearance results in a reduction of the total radial expansion necessary for the desired sealing force which, in turn, allows the tapered pin to be sized so that as part of the manufacturing process the pin can be preinserted into the tapered plug body socket where it will be frictionally retained without unacceptable distortion of the plug body. In configurations involving a cylindrical, non-tapered socket, the outer end of the socket must be adapted to allow room for the expansion means to be partially preinserted without unduly distorting the plug body so as to prevent snug engagement in the installation bore. The preassembly of the pin and plug prevents contamination of the plug socket and possible mismatching of parts, eliminates the necessity for a vent bore through the pin and increases the convenience of the user on installation. Elimination of the vent bore further reduces the manufacturing costs of the expansion member.

The outer plug body surface may be formed in a number of ways to aid in the sealing engagement with the installation bore. In the illustrated preferred embodiments, axially spaced, annular, peripheral grooves are formed in the outer plug body surface to provide axially alternating lands and grooves. Upon radial expansion of the plug body, the lands will form annular seals for retaining the plug within the installation bore. Although the illustrated grooves are generally U shaped such that the lands have squared edges, alternative shapes are possible, such as V shaped grooves spaced to provide saw-toothed lands or even no grooves and lands at all.

The principal aim of the present invention is to provide a new and improved expansion sealing plug which meets the foregoing requirements and which is easily installed without the use of a shoulder in the installation bore.

Another and further object and aim of the present invention is to provide a new and improved expansion sealing plug which will be economical to manufacture and install and which will be effective in sealing hydraulic system pressures up to 12,000 psi or more.

Another and further object and aim of the present invention is to provide a new and improved expansion sealing plug for sealing openings with a relatively wide range of diameters.

Another and further object and aim of the present invention is to provide a new and improved expansion sealing plug that can be installed with a minimum radial clearance between the plug surface and the installation bore.

Other objects and advantages of the invention will become apparent from the Description of the Preferred Embodiments and the Drawings and will be in part pointed out in more detail hereinafter.

The invention consists in the features of construction, combination of elements and arrangement of parts exemplified in the construction hereinafter described and the scope of the invention will be indicated in the appended claims.

DESCRIPTION OF THE PREFERRED EMBODIMENT(S)

Figure 1:
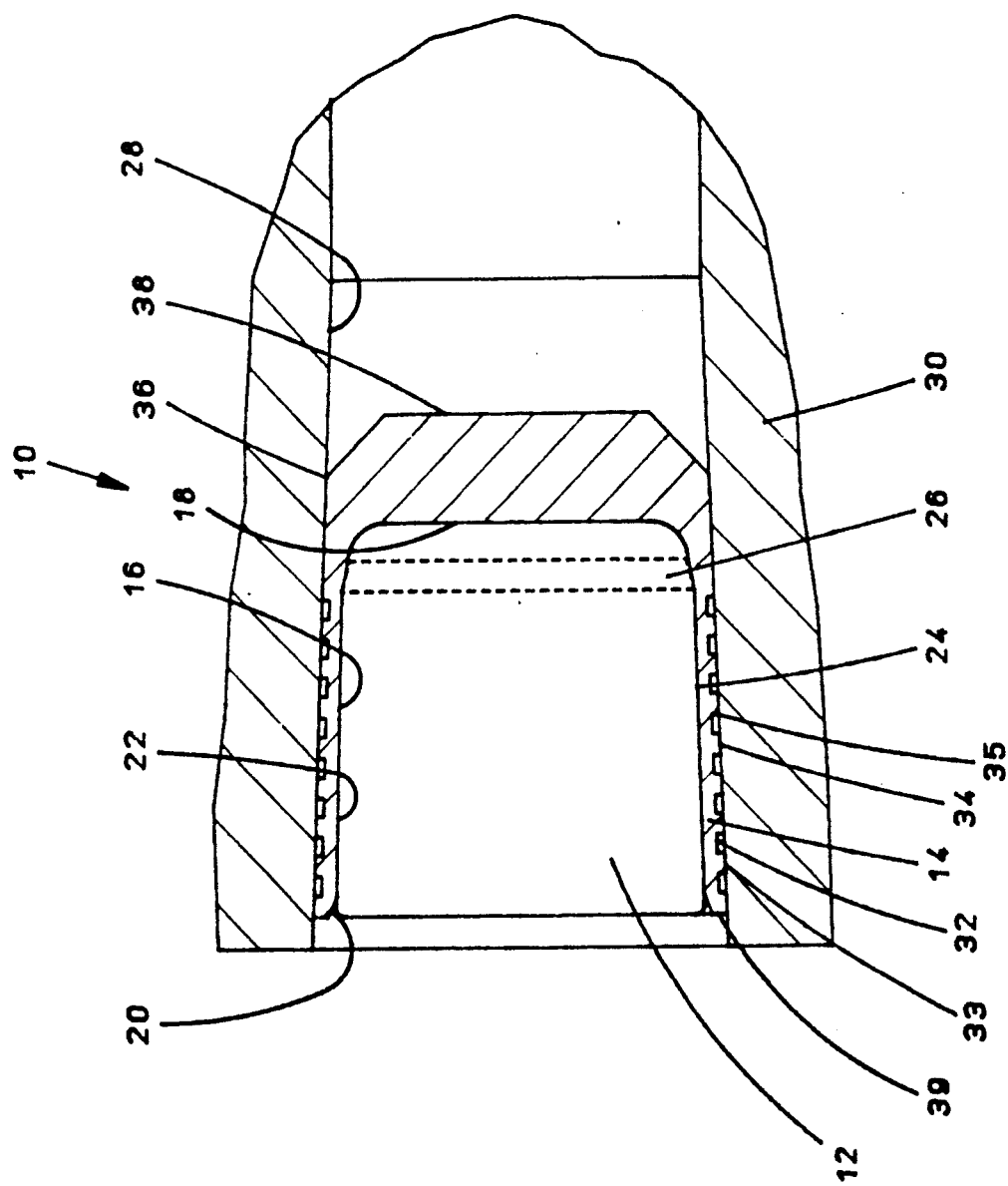
FIG. 1 is an enlarged, longitudinal section view of an installation of a preferred embodiment of an expansion sealing plug constructed in accordance with the present invention, showing an outer body of the plug in section and an inner pin of the plug in broken lines.
Figure 2:
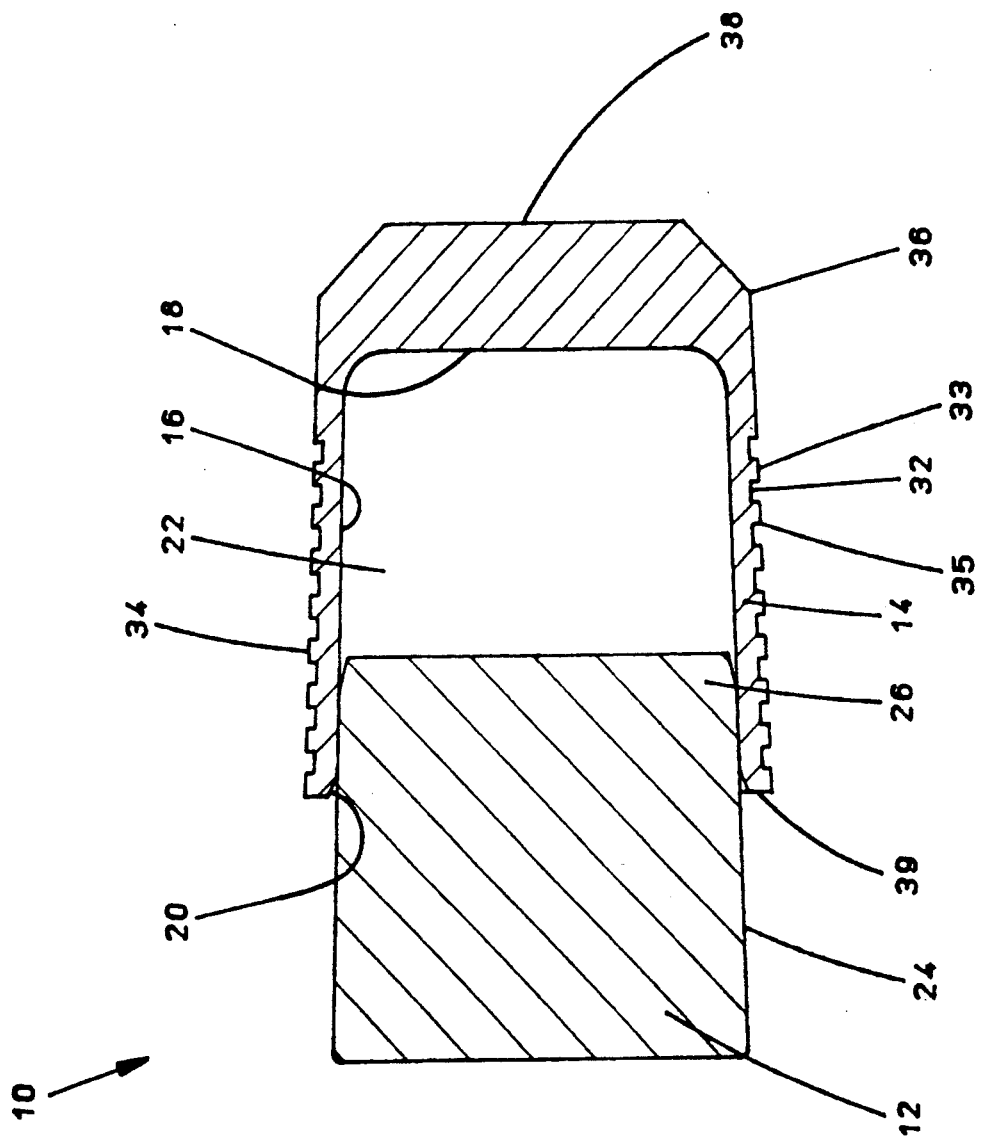
FIG. 2 is an enlarged, longitudinal section view, partly in section, of the inner pin of a preferred embodiment of an expansion sealing plug constructed in accordance with the present invention.
Figure 3:
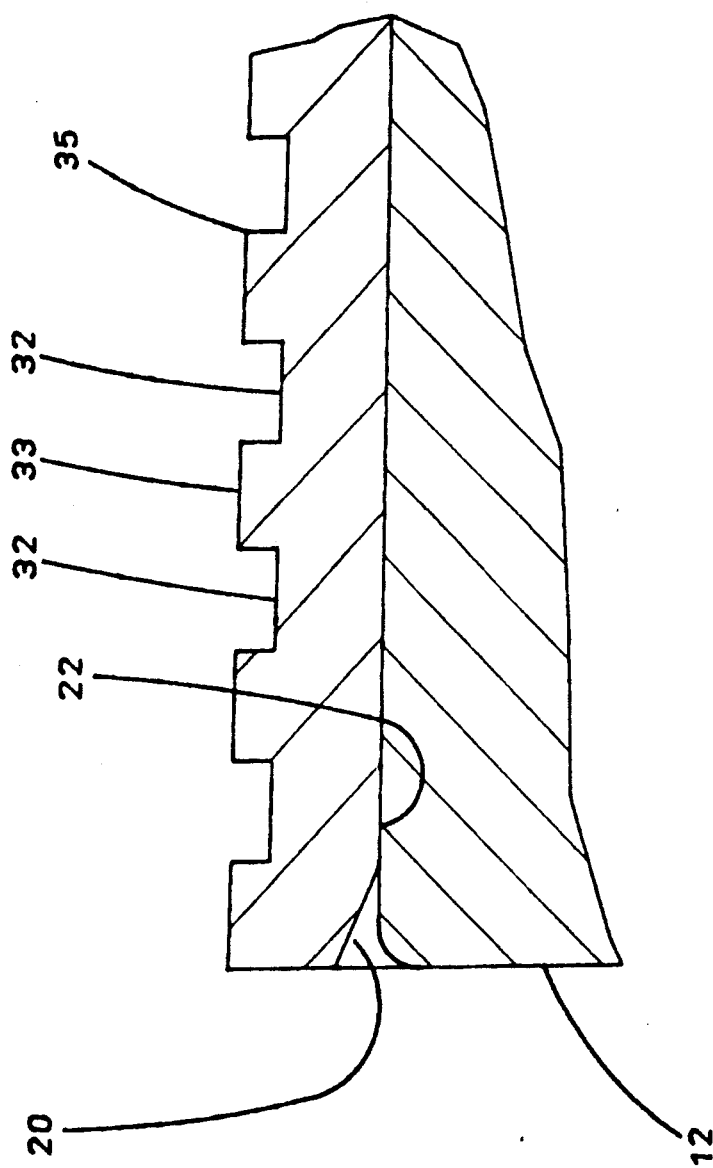
FIG. 3 is an enlarged, longitudinal section view, partly in section, of a portion of the outer body of a preferred embodiment of an expansion sealing plug constructed in accordance with the present invention, showing the peripheral grooves thereof.

With reference to the drawings wherein like numerals represent like parts throughout the figures, a sealing plug in accordance with the present invention is generally designated in FIG. 1 by the numeral 10, consisting of an expansion means comprising an inner generally frusto-conical pin 12 and an outer, generally frusto-conical plug body 14 having an internal, blind, coaxial bore 16 for receiving the inner pin 12. The bore 16 in the plug body 14 has a constant axial taper between an inner end wall 18 of the bore 16 and a enlarged opening 20 formed by a slight chamfer at the outer end of the bore 16. A frusto-conical socket 22 is thereby formed which extends nearly the entire length of the bore 16 and which has its larger diameter at its outer end (i.e. at the opening 20). The inner pin 12 has an outer generally frusto-conical surface 24 with a taper angle generally conforming to the taper, if any, of the socket 22. The outer pin surface 24 forms a frusto-conical pin wedge extending nearly the entire length of the pin 12 from its outer end to a chamfered or rounded inner end 26.

The socket 22 as shown in FIG. 1 has a taper angle such that the tangent of the included angle ("a"), meaning the ratio of the amount by which a larger inside diameter of socket 22 ("D") exceeds a smaller inside diameter of socket 22 ("d") to the axial distance between the planes of D and d ("l") equals 0.0365, i.e. Tangent $a = (D-d)/l = 0.0365$, where "a" is the included angle of taper of socket 22, "D" is the inside diameter of socket 22 at a point generally toward opening 20 but not including the chamfered area, "d" is the inside diameter of socket 22 at a point between point D and inner wall 18 but not including the chamfered area, and "l" is the axial distance between the planes through D and d that are perpendicular to the axis of plug 10. The socket 22 taper angle in the illustrated preferred embodiment is therefore about 2 degrees. The socket 22 taper angle is determined in relation to the size of the plug 10 and in other sizes or configurations may have a greater or lesser taper angle. Due to the desirability of preinsertion of the pin 12 into the plug body, it is generally desireable that the taper angle be approximately equal to or less than that required for the pin 12 to be "self-holding" rather than "self-releasing", as those terms are used by the American National Standard Institute, see definitions in *MACHINERY'S HANDBOOK, 22nd Edition,* by Erik Oberg, Franklin D. Jones, and Holbrook L. Horton, Industrial Press, Inc., 1985, page 1734, the contents of which are incorporated herein by this reference. Therefore, the taper angle of socket 22 is generally less than 0.625 inch per foot ("Morse Taper") for most metals. Since the co-efficient of friction of materials used in the pin 12 and plug body are relevant considerations to the self-holding characteristics of the taper angle of socket 22, it is anticipated that variations in the acceptable range of taper angles may occur in the event plastic or composite materials or presently unanticipated materials are utilized in the manufacture of the components of plug 10. Similarly, specific manufacturing methods may affect surface finish and thereby cause the range of acceptable taper angles to vary. The selection of a specific taper angle for socket 22 depends upon consideration of a number of factors including the desired amount of expansion, the taper required to allow for preinsertion of the expansion member 12 or 42 into the socket 22, the allowable force to be applied to the pin 12 upon being driven into the socket 22, and the length of the socket 22 as well as the coefficient of friction of the materials used. It is possible to vary the axial distribution of the radial expansive force by intentionally "misaligning" the pin 12 within socket 22, such that the taper angles of pin 12 and socket 22 are not the same. In such cases, if the taper angle of the pin 12 is greater than the taper angle of socket 22, then the radial expansive force toward the plug body outer end 39 is increased; and if the taper angle of the pin 12 is less than the taper angle of socket 22 the radial expansive force toward the plug body inner end 38 is increased. It is to be anticipated that in the event socket 22 is formed with a minimal or nonexistent taper such that the inner pin 12 is essentially cylindrical, the preinsertion of pin 12 into socket 22 would require plug body opening 20 to be modified to provide an enlarged inside diameter to receive and retain pin 12.

In the preferred embodiment illustrated in FIG. 1, the plug body 14 has a frusto-conical bore-engaging surface 34 that extends from an edge 36 of the inner end 38 of the plug body 14 to the outer end 39 of the plug body 14 to sealingly engage a tapered counterbore 28 formed or reamed in the component part 30. In the illustrated preferred embodiment, edge 36 is chamfered at a forty-five degree angle; however, it is anticipated that edge 36 may take a variety of forms including rounded or a sharp corner, depending upon the materials used and the method of manufacture. The taper of the outside surface 34 of the plug body 14 has a taper angle such that the tangent of the included angle ("b"), meaning the ratio of the amount by which a larger outside diameter of bore-engaging surface 34 ("D'") exceeds a smaller outside diameter of bore-engaging surface 34 ("d'") to the axial distance between the planes of D' and d' ("l'") equals 0.075, i.e. Tangent $b = (D'-d')/l' = 0.075$, where "b" is the included angle of taper of bore engaging surface 34, "D'" is the outside diameter of bore engaging surface 34 at a point generally toward plug body outer end 39, "d'" is the outside diameter of bore engaging surface 34 at a point between point D' and edge 36 but not including the chamfered area, and "l'" is the axial distance between the planes through D' d' that are perpendicular to the axis of plug 10. The taper of 0.075 represents the tangent of the included angle b of approximately 4 degrees 17 minutes. The plug body surface 34 taper angle may be selected from a range of from 1 degree to 7 degrees, but 4.3 degrees is believed to be an acceptable compromise. It is understood that plug body surface 34 taper angles larger than 4.3 degrees result in an unjustifiable and undesirable drop off in retentive capacity obtainable for a given amount of radial expansion. On the other hand, generally, as the plug body surface 34 taper angles decrease, problems associated with the prior art plugs without such taper increase; for example, the radial tolerance between the counterbore 28 and the outside plug surface 34 becomes more critical and the plug 10 tends to migrate within the counterbore 28 in an axially inward direction in response to the force of installation. In addition, plug body surface 34 taper angles greater than those in the "Self-holding" range may provide greater convenience in handling as manual insertion and removal from the counter bore 28 would be easier. It is understood that available taper reamers are more likely to develop a variation in diameter from use, i.e., from wear or burrs, than a variation in taper angle. The proper, snug seating of Plug 10 is more dependant on the correspondence of the taper angles of the plug body surface 34 and the counter bore 28 than on the diameters of said parts since diameter variations, within relatively wide limits, simply cause a variation in the axial position of the installed plug 10. Thus the probability of a misalignment is reduced. In the event of a slight mismatch of taper angles, a misalignment of the plug 10 within the counterbore 28 will initially occur until the force exerted on pin 12 forces enough axially inward movement of plug 10 to cause a more close fit.

The plug body 14 is shown with eight identical, equally axially spaced, peripheral, generally U-shaped, annular grooves 32 formed by the bore engaging surface 34. The grooves 32 are axially positioned to lie between the transverse end planes of the socket 22 and of the outer pin surface 24 of the installed pin 12. The grooves 32 have a total axial width which is approximately equal to the total axial width of the intermediate peripheral lands 33. As the plug body 14 is expanded during installation of the inner pin 12, generating a substantial radial force between the plug body 14 and its counterbore 28, the plug body 14 is radially expanded elastically and is plasticly deformed. The plastic deformation causes axial flow of the material at the periphery of the plug body which reduces the axial width of the peripheral grooves 32 of the installed plug. The circular gripping edges 35 are thereby made more acute to enhance or at least maintain their engagement with and effectiveness in gripping the wall of the plug body counterbore 28. It is to be noted that the precise configuration of grooves 32, as illustrated, are specific to machined metal components and may change to some extent depending upon the materials and method of manufacture used. In the illustrated embodiment, the grooves 32 are cut perpendicular to the axis of plug body 14. In low pressure applications it may be possible to eliminate grooves 32 or to make other adaptations of bore engaging surface 34 while achieving the necessary retaining force upon installation. Alternative configurations include V shaped grooves, creating saw-tooth shape lands.

Figure 4:
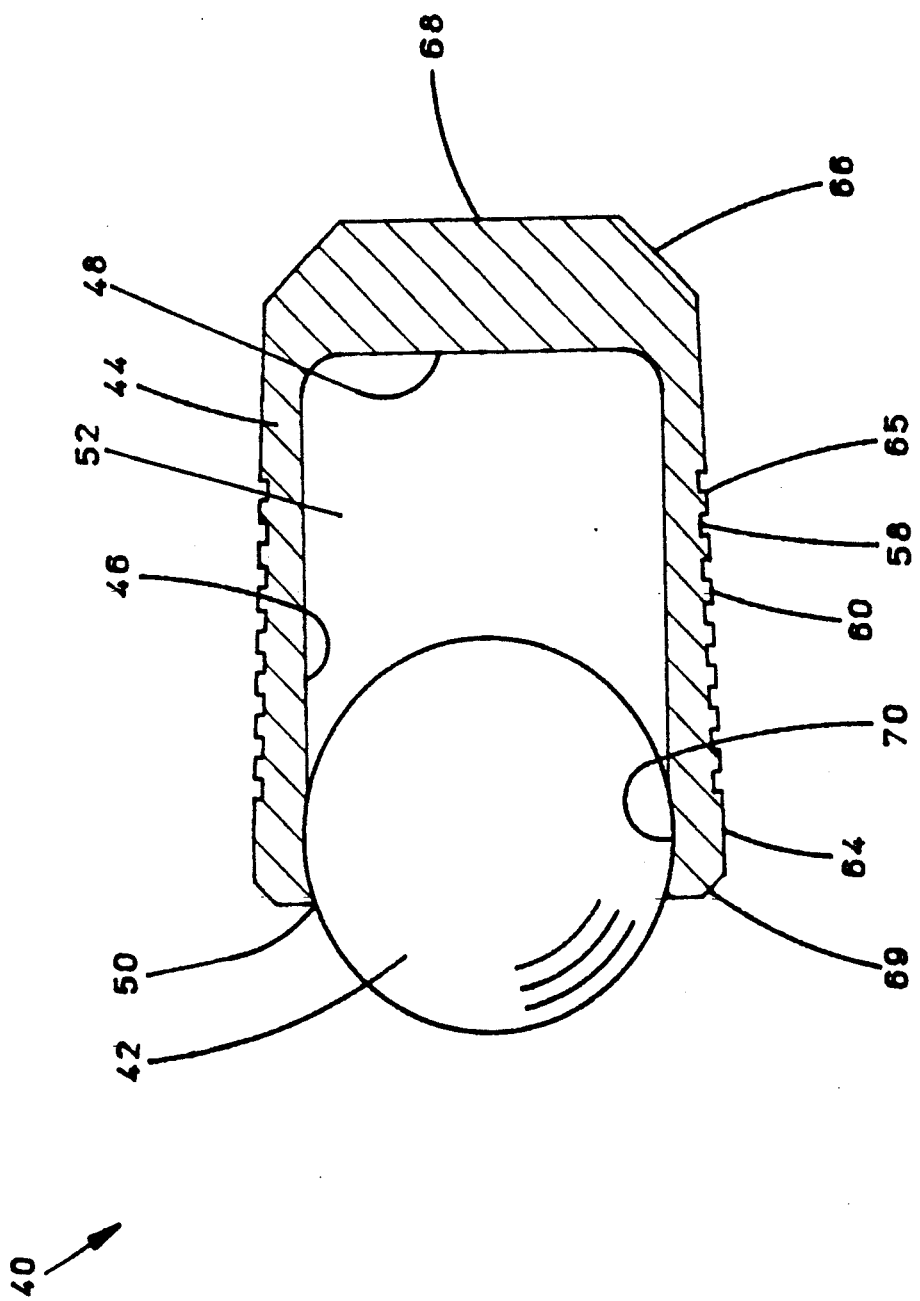
FIG. 4 is an enlarged, longitudinal section view of an installation of an alternative embodiment of an expansion sealing plug constructed in accordance with the present invention, showing a spherical expansion member.

FIG. 4 illustrates an alternative embodiment of the present invention, generally designated as plug 40. While in the embodiment illustrated in FIG. 1, the expansion member constitutes pin 12, in the embodiment illustrated in FIG. 4, the expansion member constitutes a spherical ball member 42, accordingly the term "expansion member" may be used herein from time to time meaning either pin 12 or ball 42. Except as noted above or as otherwise noted herein or as may be obvious, the features and characteristics of plug bodies 14 and 44 are similar. Plug 40 has a plug body inner wall 48 similar to the plug body inner wall 18 of plug 10 and is installed in a method similar to the installation of plug 10. Plug 40 has a bore engaging surface 64 similar to bore engaging surface 34 of plug 10 and said bore engaging surface 64 comprises axially alternating peripheral lands 60 and grooves 58 similar to the lands 33 and grooves 32 of plug 10, and lands 60 have land edges 65 similar to the land edges 35 of lands 33 of plug 10. Chamfered plug body edge 66, plug body inner end 68 and plug body outer end 69 correspond and are similar to the chamfered plug body edge 36, plug body inner end 38 and plug body outer end 39 of plug 10, respectively. Therefore, with the noted exceptions, statements made herein regarding the features and characteristics of the elements and features of plug 10 are to be considered as applying to the corresponding elements and features of plug 40. A notable exception is the adaptation of opening 50 of the plug body bore 46. Specifically, an area of enlarged inside diameter of bore 46 provides recess 70 that receives and retains the ball 42, accommodating the outside diameter of ball 42 without distorting the outer surface 64 of plug body 44, thereby allowing the preassembly of plug 40. In addition, the opening 50 of the socket 52 may be crimped after partial preinsertion of the ball 42 for the secure retention of the ball 42 after preinsertion into recess 70. Further, since the outside diameter of ball 42 remains relatively constant, the socket 52 need not be tapered.

In both illustrated preferred embodiments, plug 10 and plug 40, the expansion member 12 or 42, is can be partially inserted into the socket 22 (or 52), so that the plug 10 or plug 40 can be preassembled as a one piece unit. Due to the amount of expansion required in plug body 14, and the angle of taper of the socket 22 and pin 12, the pin 12 will be retained therein by friction without requiring such forceful insertion as would unacceptably distort the plug body 14. Alternatively, in plugs of insufficient socket and pin taper, the plug body 14 outer end inside diameter may be increased and/or the outside diameter of pin 12 inner end may be decreased such that the pin 12 can be partially preinserted into the socket 22 while maintaining the desired taper of the outer surface 23 of the plug body 14. Since the expansion member 12 or 42 is partially inserted into the plug body 14 or 44 during manufacture, the preassembled expansion member 12 or 42 and plug body 14 or 44 may be inserted into the counterbore 28 as a unit. Construction of the plug 10 or 40 as a one piece unit prevents the otherwise possible inclusion of foreign matter in the plug body socket 22 or 52 and prevents mismatching of plug bodies with expansion members 12 or 42. In addition, preassembly simplifies and aids the procedure of installation by requiring less manual dexterity than is necessary with separate parts, particularly in the miniature sizes.

The sealing plug 10 is used and installed in a method similar in many respects to that described in the aforementioned U.S. Pat. No. 2,821,323, with exceptions as noted herein. Briefly, the tapered counterbore 28 is reamed, cast or otherwise formed in the component part 30 with the same taper angle and approximately the same diameter as the outer surface 34 of the unstressed plug body 14 of the plug 10 dimensionned with the appropriate outside diameter. The preassembled plug body 14 and pin 12 are mounted within the counterbore 28 by inserting the same therein until the outer surface 34 of the unstressed plug body 14 snugly engages the inner surface of the counterbore 28. The pin 1 is then driven axially into the bore 16 of plug body 14 until the outer end of the pin 12 is flush with the outer end 39 of the plug body 14 as shown in broken lines in FIG. 1. whereby the plug body is radially expanded and the outer surface 34 of the plug body 14 forcibly and sealingly engages the inner surface of the counterbore 28. Installation of plug 40 is accomplished in essentially the same manner as set forth above with respect to plug 10.

The sealing plug 10 is designed to provide the desired amount of radial expansion of the outer plug body 14 in accordance with the strength and hardness of the material of the associated component part 30. The range of acceptable radial interference between the unstressed expansion member 12 or 42 and plug body 14 or 44 is predetermined for each plug size. The average diameter of the expansion member 12 or 42 is related to the average diameter of the socket 22 or 52 to provide one of several predetermined diametral interferences for expanding the plug body 14 or 44 outwardly by driving the expansion member into the plug body 14. The plug body 14 or 44 is thereby expanded outwardly by the expansion member into engagement with the tapered wall of its counterbore 28. In order to ensure that the plug 10 is firmly seated within its counterbore 28 and capable of withstanding pressure, the dimensions of the expansion member 12 or 42 are established to provide a substantial radial force between the plug body 14 and the associated part 30. That radial force is dependent in part on (a) the radial expansion of the plug body 14 by the expansion member 12 or 42, (b) the radial expansion of the associated part 30 and (c) the elastic/plastic elongation of the plug body 14 and/or expansion member 12 o 42. The diameter of the expansion member 12 or 42 is made greater than the diameter of the plug body socket 22 by an amount corresponding to the desired theoretical radial expansion of the plug body 14. For example, the unstressed interference or difference in the outside diameter of the pin outer surface 24 and the inside diameter of the plug body socket 22 is variable up to about 0.008 inches. Plug body 14 may be matched with a variety of pins 12 variously dimensioned to cause a corresponding variety of amounts of radial expansion.

The expulsive force exerted against plug 10 or 40 is a function of the cross-sectional area exposed to the media within the counterbore, while the retentive capability is a function of both the amount of expansion and the area of the bore engaging surface 34 of the plug body 14. Since the ratio of the bore engaging surface to cross-sectional area is higher for smaller diameter plugs, smaller diameter plugs generally require less radial expansion to achieve retentive capability, as determined by blowout pressure, equivalent to that of plugs of larger diameter.

As stated, the amount of expansion of plug 10 can be varied depending upon the proof pressure desired and limitations of structure and/or material of the component 30 or the plug body material. Relatively precise selection of the expansion desired for particular application is possible because of the snug fit of the tapered surfaces of counterbore 28 and plug body outer surface 34 whereby, as aforesaid, most if not all of the expansion of the plug body 14 results in radial, sealing force rather than being expended in bridging installation bore tolerances. The illustrated preferred embodiment, for example, has been tested at the 0.41 inch diameter size, in aluminum, with pin 12 of varying diameter to provide three expansion selections. The variations in pin 12 diameter result in variations in the amount of radial expansion and the "Proof Pressure", defined here as one-half the lowest pressure at which the plug has failed by blow-out, as set forth in the following chart:

| Diameter (inches) | Expansion (inches) | Proof Pressure (pounds per square inch) |
| --- | --- | --- |
| .41 | .008 | 5,000 |
|  | .006 | 4,000 |
|  | .004 | 3,000 |

As will be anticipated, the sealing plug of the present invention is suitable for manufacture over a wide range of sizes, following chart illustrates by way of example, the dimensions of an exemplar of plug 10 as illustrated in FIG. 1:

| | |
| --- | --- |
| Plug body outside diameter, outer end | 0.4100 inches (10.41 mm) |
| Plug body outside diameter, inner end | 0.382 inches (9.70 mm) |
| Tangent of plug body bore-engaging surface taper | .075 |
| Plug body inside diameter, outer end | 0.364 inches (9.25 mm) |
| Plug body inside diameter inter end | 0.354 inches (8.99 mm) |
| Tangent plug body socket inside taper angle | .0365 |
| Depth of plug body socket | .360 inches (9.14 mm) |
| Pin length (all expansions) | .335 inches (8.51 mm) |
| Tangent pin taper angle (all expansions) | .0365 |
| Pin outer end, outside diameter [0.008 inch (0.2 mm) expansion] | .372 inches (9.45 mm) |
| Pin outer end, outside diameter [0.006 inch (0.15 mm) expansion] | .370 inches (9.40 mm) |
| Pin outer end, outside diameter [0.004 inch (0.10 mm) expansion] | .368 inches (9.35 mm) |

It should be appreciated and anticipated that while plug 10 has been fabricated of aluminum, a variety of materials could be used with satisfactory, but somewhat different results. It is specifically anticipated that stainless steel plastic or composite materials may be used and the differing characteristics of such materials would be design considerations. In applications involving softer or more plastic materials, the plug expansion and/or the diametral interference could be considerably greater and harder or more brittle materials would not tolerate as much expansion without cracking. Generally, the plug body 14 or 44 and expansion member 12 or 42 should be thermally compatible with each other and with the material of the component 30 to prevent the stresses or separations potentially caused by unequal expansion and contraction rates. It has been found that the material of the tapered pin 12 or ball 42 may be the same as, but is preferably slightly harder than, the base material of the plug body 14 or 44 which should have approximately the same hardness as the material of the component 30 The yield strength of the base material of the plug body 14 ensures that the radial expansion force between the plug 10 and its mounting bore wall is maintained within an acceptable tolerance. In the case of plug body 44, materials are preferably chosen that will tend to retain the radial expansion imparted by ball 42, in those expanded sections not supported by ball 42.

Further, it will be appreciated that a plug body 14 employing a machineable base material of lesser hardness and lesser yield strength and an outer surface material of substantially greater hardness and greater yield strength provides a more effective interengagement between the outer surface 34 of the plug body 14 and the wall of its counter bore 28 and provides for firmly locking the plug 10 in position against hydraulic system pressures. This tendency has been disclosed in the U.S. Pat. No. 4,867,333 to Kolp, Anderson and Dickey which disclosure is incorporated herein. According to this adaptation, the plug body 14 consists of a base material of certain hardness and yield strength and an outer surface material of substantially higher hardness and yield strength.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. An expansion sealing plug, comprising a plug body having a first axial end and a second axial end of larger diameter than the first end, with an outer surface that is generally uniformly tapered between the first and second ends at an included angle of taper of from about 1.0 to about 7.0 degrees, said plug body having a central bore, and an expansion means having an outside diameter that is greater than the inside diameter of the central bore of the unexpanded plug body and adapted to radially expand the tapered outer surface of the plug body into frictional locking engagement with the wall of a plug mounting bore without substantially altering the taper of the outer surface.

2. An expansion sealing plug according to claim 1, wherein the plug body central bore is tapered, being of larger inside diameter at the second end of the plug body than toward the first end of the plug body.

3. An expansion sealing plug according to claim 2, wherein the opening of the central bore of the unexpanded plug body is of sufficient internal diameter to receive and frictionally retain the expansion means partially inserted therein.

4. An expansion sealing plug comprising a plug body having a first axial end and a second axial end of larger diameter than the first end, with an outer surface that is generally uniformly tapered between the first and second ends at an included angle of taper of from about 1.0 to about 7.0 degrees and an expansion means comprises a pin having an external frusto-conical surface with an outside diameter that is greater than the inside diameter of the central bore of the unexpanded plug body and adapted to radially expand the tapered outer surface of the plug body into frictional locking engagement with the wall of a plug mounting bore and wherein the opening of the central bore of the unexpanded plug body is of sufficient internal diameter to receive and frictionally retain the expansion means partially inserted therein.

5. An expansion sealing plug according to claim 4, wherein the central bore is tapered.

6. An expansion sealing plug according to claim 5, wherein the plug body further comprises a plurality of axially spaced, peripheral, annular grooves and lands along the outer surface of the plug body and the included angle of taper of the outer surface of the pin and the inner surface of the coaxial bore is about 2 degrees.

7. An expansion sealing plug, comprising a plug body having an outer surface that is tapered before expansion and having a first axial end and a second axial end of larger diameter than the first axial end and having a central bore extending from the second axial end of the plug body toward the first axial end of the plug body, and a ball shaped inner expansion means having a diameter larger than the diameter of the coaxial bore by a predetermined amount and adapted to be driven into said coaxial bore to expand the plug body into engagement with the wall of the plug mounting bore.

8. An expansion sealing plug according to claim 7, wherein the included angle of taper of the plug body is from about 1.0 to about 7.0 degrees.

9. An expansion sealing plug according to claim 8, wherein the included angle of taper of the outer surface of the plug body is about 4.3 degrees.

10. An expansion sealing plug according to claim 9, wherein the central bore is of sufficient internal diameter at the outer opening end to receive and frictionally retain the expansion means partially inserted therein.

11. An expansion sealing plug according to claim 10, wherein the plug body further comprises a plurality of axially spaced, peripheral, annular grooves along the outer surface of the plug body.

12. An expansion sealing plug, comprising a plug body having an outer surface that is generally uniformly tapered at an included angle of taper of about 4.3 degrees and with a first, inner, axial end and a second, outer, axial end of larger diameter than the first end, having an opening at the second axial end of the plug body and a central bore extending from said opening toward the first axial end of the plug body, and an expansion means having an outside diameter that is greater than the inside diameter of the central bore and adapted to expand the tapered outer surface of the plug body into frictional locking engagement with the wall of a plug mounting bore.

13. An expansion sealing plug according to claim 12, wherein the central bore is tapered.

14. An expansion sealing plug according to claim 13, wherein the expansion means comprises a pin having an external frusto-conical surface.

15. An expansion sealing plug according to claim 14, wherein the coaxial bore is of sufficient internal diameter at the outer end to receive and frictionally retain the expansion means partially inserted therein.

16. An expansion sealing plug according to claim 15, wherein the included angle of taper of the outer surface of the pin and the inner surface of the coaxial bore is about 2 degrees and the plug body further comprises a plurality of axially spaced, peripheral, annular grooves along the outer surface of the plug body.

* * * * *